United States Patent [19]

Vollmer

[11] Patent Number: 4,752,108
[45] Date of Patent: Jun. 21, 1988

[54] INTEGRATED OPTICAL LENS/COUPLER

[75] Inventor: Theodor Vollmer, Stuttgart, Fed. Rep. of Germany

[73] Assignee: Alcatel N.V., Amsterdam, Netherlands

[21] Appl. No.: 823,890

[22] Filed: Jan. 29, 1986

[30] Foreign Application Priority Data

Jan. 31, 1985 [DE] Fed. Rep. of Germany ....... 3503203

[51] Int. Cl.$^4$ ................................................ G02B 6/12
[52] U.S. Cl. ................................................ 350/96.12
[58] Field of Search ............... 350/96.11, 96.12, 96.13, 350/96.14, 96.15, 96.16, 96.18, 96.19

[56] References Cited

U.S. PATENT DOCUMENTS

| | | | |
|---|---|---|---|
| 3,908,121 | 9/1975 | Riseberg et al. | 350/96.19 X |
| 4,111,524 | 9/1978 | Tomlinson, III | 350/96.19 |
| 4,198,117 | 4/1980 | Kobayashi | 350/96.19 |
| 4,262,995 | 4/1981 | Tangonan | 350/96.16 |
| 4,479,697 | 10/1984 | Kapany et al. | 350/96.18 |
| 4,515,428 | 5/1985 | Findakly | 350/96.12 |
| 4,522,462 | 6/1985 | Large et al. | 350/96.19 |
| 4,557,566 | 12/1985 | Kikuchi et al. | 350/96.19 X |
| 4,583,820 | 4/1986 | Flamand et al. | 350/96.19 |
| 4,621,894 | 11/1986 | Gouali | 350/96.19 |
| 4,640,585 | 2/1987 | Nojiri | 350/96.12 |

FOREIGN PATENT DOCUMENTS 3432239 4/1985 Fed. Rep. of Germany .

Primary Examiner—William L. Sikes
Assistant Examiner—Frank González
Attorney, Agent, or Firm—Spencer & Frank

[57] ABSTRACT

In the integrated optical multiplexer/demultiplexer (lens coupler), a reflection grating is deposited on an imaging lens having a plane surface. Input/output light beams are guided to the imaging lens via an integrated optical device containing planar waveguides for the light beams.

3 Claims, 1 Drawing Sheet

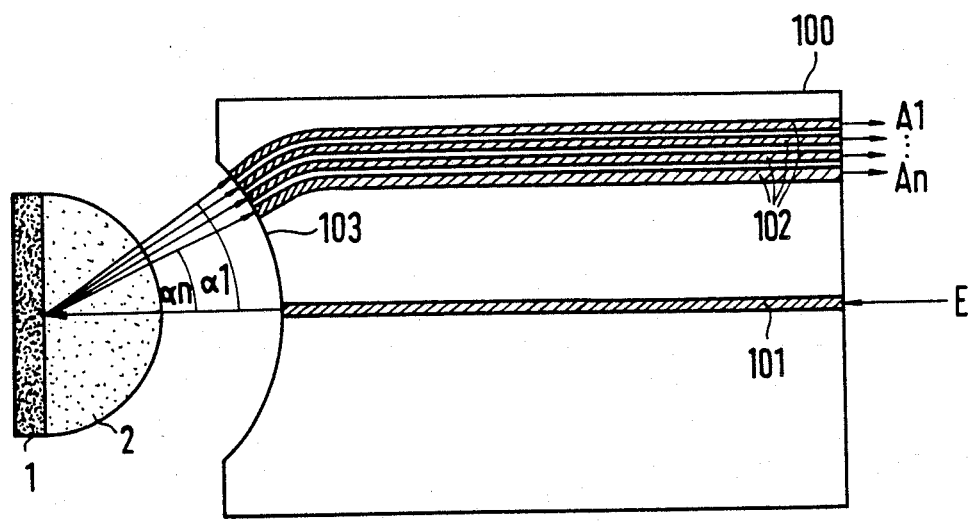

INTEGRATED OPTICAL LENS/COUPLER

BACKGROUND OF THE INVENTION

The present invention relates to an optical multiplexer/demultiplexer comprising an imaging lens and a reflection grating of the type disclosed in U.S. application Ser. No. 771,451 filed Aug. 30, 1985.

Several embodiments are explained in the aforementioned application. In those embodiments, light beams are guided to the respective inputs/outputs by optical fibers which make different angles with the perpendicular to the reflection grating. In the manufacturing process, accurate adjustment of the optical fibers is complicated.

SUMMARY OF THE INVENTION

It is the object of the invention to provide an optical multiplexer/demultiplexer of the above kind which is easy and inexpensive to manufacture.

In the novel multiplexer/demultiplexer, the individual light beams are guided to the inputs/outputs (input/output ports) via an integrated optical device. Only a simple adjusting operation is required. It is possible to manufacture the entire multiplexer/demultiplexer as an integrated optical device.

BRIEF DESCRIPTION OF THE DRAWINGS

The invention is more fully explained, by way of example, with the help of the single figure of the accompanying drawing, which is a schematic representation of the novel multiplexer/demultiplexer.

DESCRIPTION OF THE PREFERRED EMBODIMENT

The multiplexer/demultiplexer is a reciprocal component which can be used both as a multiplexer and as a demultiplexer. The component can also be used simultaneously for both operating modes, as is explained, e.g., with the aid of FIG. 3 of the aforementioned application. For the sake of simplicity, only the demultiplex mode is described hereafter. therefore A hemispherical lens 2 is provided on whose planar surface a reflection grating 1 is deposited. Instead of the hemispherical lens, a lens can be used which has the shape of a half cylinder, or of a small slice cut out of a hemisphere or the half cylinder.

The dimensions can be chosen as follows: radius of the lens: 22.7 mm; grating constant g: 3.3 $\mu$m; refractive index n of the glass of the lens: 1.66 (Schott glass LaKN 12).

The light beam E is split by the demultiplexer into component beams $A_1 \ldots A_n$ having different frequencies by reflecting the light of the input light beam in different directions $\alpha_1, \ldots, \alpha_n$, depending on the frequencies.

Several planar optical waveguides 101 and 102 are implemented in the integrated optical device 100. The input light beam E is guided to the lens 2 via a first optical waveguide 101. The output light beams are guided by additional optical waveguides 102 to the output or output port of the demultiplexer. In the area (region) adjacent to the imaging lens, the additional optical waveguides 102 are arranged in the integrated optical device 100 in such a way as to point in the directions from which the output light beams to be guided by the additional optical waveguides to the output of the demultiplexer strike the integrated optical device. It follows that the optical waveguides in this area (region) of the integrated optical device are arranged radially with respect to the focus of the imaging lens 2. In the area (region) adjacent to the output of the demultiplexer, the additional optical waveguides 102 in the integrated optical device are arranged parallel to each other.

Since the light beams are guided in an integrated optical device rather than along individual optical fibers, it is no longer necessary to adjust a number of individual optical fibers to make sure that the component beams are coupled into them in the best possible manner; only the single integrated optical device has to be adjusted. Furthermore, in the area of the imaging lens, the individual waveguides in the integrated optical device can be closer together than in the solution using individual optical fibers. The optical bandwidth of the demultiplexer is thus increased. Because the optical waveguides in the output area of the demultiplexer are parallel to each other, the means which couple out the output light beams from the demultiplexer and couple them into other means of transmission are easy to implement, e.g., by means of connectors.

This solution is also very suitable for the integration of further elements. It is possible, e.g., to implement the integrated optical device so that it contains not only the optical waveguides but also optical-to-electrical transducers which receive the light to be converted directly from the additional waveguides. The same applies analogously to the transmitting elements, e.g. laser diodes, if the component is used in the multiplex mode. When operated simultaneously as a multiplexer and demultiplexer, the integrated optical device contains optical-to-electrical transducers and transmitting elements.

It is mentioned in the aforementioned application that optimum imaging of the output light beams requires that the distance between the imaging lens 2 and the additional optical waveguides 102 be chosen depending on the frequency. While this requirement can hardly be met if the demultiplexer is implemented by means of individual optical fibers, it can be satisfied to advantage with the novel solution herein by suitably shaping that surface of the integrated optical device in which the additional optical waveguides end. The shape of this surface 103 in relation to the imaging lens is governed by two requirements:

The light beams are to strike the surface at right angles; and in accordance with the laws of optical imagery, the distance between the imaging lens and the surface is to be chosen according to the frequency of the output light beam to be guided to the output of the demultiplexer by the respective optical waveguide, such that the output light beam is imaged on the optical waveguide in optimum fashion.

If these requirements are met, coupling losses will be kept low. By "optimum imaging" is to be understood that the area of the imaged light beam is equal to the cross-sectional area of the waveguide.

In the above description, it is assumed that the imaging lens with the reflection grating and the integrated optical device are two components which are held in the required position by suitable means. However, it is also possible to implement the complete multiplexer/demultiplexer as an integrated optical device. In that case, the imaging lens 2 and the space between the imaging lens 2 and the integrated optical device 100 is occupied by a transparent substrate. The imaging lens is implemented by a suitable (e.g. parabolic) refractive index profile.

Further details, e.g. concerning the implementation of the integrated-optical device, are not described here as they are known to those skilled in the art.

I claim:

1. An optical multiplexer/demultiplexer, comprising:
   a reflection grating and an imaging lens, said imaging lens having at least one planar surface and being connected directly to said reflection grating; and
   an integrated optical device, including a plurality of mutually adjacent planar waveguides, each of said waveguides havng a region adjacent said imaging lens and an input/output port, and extending from said region adjacent said imaging lens to said input/output port, said waveguides in the respective regions thereof adjacent said imaging lens, respectively pointing in respective directions of light beams emanating from and/or striking said imaging lens, said waveguides in respective regions thereof adjacent to the respective input/output ports thereof extending parallel to each other.

2. An optical multiplexer/demultiplexer as in claim 1, wherein said directions converge toward said reflection grating.

3. An optical multiplexer/demultiplexer as in claim 1, wherein said integrated optical device, said imaging lens and said reflection grating are integrated together in a single unified structure.

* * * * *